United States Patent
Baumann (10) Patent No.: US 12,217,400 B2
(45) Date of Patent: Feb. 4, 2025

(54) METHOD FOR IMAGE PROCESSING BY MEANS OF A NEURAL NETWORK AND METHOD FOR TRAINING A NEURAL NETWORK

(71) Applicant: Basler AG, Ahrensburg (DE)

(72) Inventor: Annika Baumann, Hamburg (DE)

(73) Assignee: Basler AG, Ahrensburg (DE)

( * ) Notice: Subject to any disclaimer, the term of this patent is extended or adjusted under 35 U.S.C. 154(b) by 402 days.

(21) Appl. No.: 17/760,707

(22) PCT Filed: Sep. 17, 2020

(86) PCT No.: PCT/EP2020/075964
§ 371 (c)(1),
(2) Date: Mar. 15, 2022

(87) PCT Pub. No.: WO2021/053066
PCT Pub. Date: Mar. 25, 2021

(65) Prior Publication Data
US 2022/0392074 A1 Dec. 8, 2022

(30) Foreign Application Priority Data
Sep. 17, 2019 (DE) ............. 10 2019 125 000.5

(51) Int. Cl.
G06T 5/70 (2024.01)
G06T 7/10 (2017.01)
G06V 10/30 (2022.01)
G06V 10/44 (2022.01)
G06V 10/82 (2022.01)

(52) U.S. Cl.
CPC .......... *G06T 5/70* (2024.01); *G06T 7/10* (2017.01); *G06V 10/30* (2022.01); *G06V 10/454* (2022.01); *G06V 10/82* (2022.01); *G06T 2207/20021* (2013.01); *G06T 2207/20084* (2013.01)

(58) Field of Classification Search
CPC ............ G06T 7/10; G06T 2207/20021; G06T 2207/20084
See application file for complete search history.

(56) References Cited

U.S. PATENT DOCUMENTS 11,468,318 B2 * 10/2022 Liu ............... H04N 7/0127

OTHER PUBLICATIONS

Samet, H., "The Quadtree and Related Hierarchical Data Structures," Computing Surveys, vol. 16, No. 2, Jun. 1984, 74 pgs.
(Continued)

*Primary Examiner* — Diane D Mizrahi
(74) *Attorney, Agent, or Firm* — Seed IP Law Group LLP (57) ABSTRACT

A computer-implemented method for processing an image includes steps of dividing the image into at least two image regions, grouping at least one of the image regions into at least one group wherein each of the image regions is assigned to exactly one group or to no group, and applying at least one kernel in a layer of a neural network to the image regions of at least one group, wherein at most one kernel is applied to the image regions of each group. The disclosure further relates to a computer-implemented method for training a neural network, to a device for processing an image in a neural network, and to a computer-readable medium.

20 Claims, 8 Drawing Sheets

(56) References Cited

OTHER PUBLICATIONS

LeCun, Y. et al., "Object Recognition with Gradient-Based Learning", D.A. Forsyth et al. (Eds.): Shape, Contour . . . , LNCS 1681, pp. 319-345, 1999.
Jain, V. et al., "Natural Image Denoising with Convolutional Networks," 2008, 9 pgs.
Boulanger, J. et al., "Patch-Based Nonlocal Functional for Denoising Fluorescence Microscopy Image Sequences," IEEE Transactions on Medical Imaging, vol. 29, No. 2, Feb. 2010, 13 pgs.
Xie, J. et al., "Image Denoising and Inpainting with Deep Neural Networks," Advances in Neural Information Processing Systems, Jan. 2012, 10 pgs.
Burger, H.C. et al., "Image denoising: Can plain Neural Networks compete with BM3D?" IEEE, 2012, 8 pgs.
Wiroteurairuang, D. et al., "K-Means Based Image Denoising Using Bilateral Filtering and Total Variation," Journal of Computer Science 10 (12): 2608-2618, 2014, 11 pgs.
Vogels, T. et al., "Denoising with Kernel Prediction and Asymmetric Loss Functions", ACM Transactions on Graphics, vol. 37, No. 4, Article 124, Aug. 2018, 15 pgs.
Choi, S. et al., "Fast, Trainable, Multiscale Denosing," IEEE, ICIP 2018, 5 pgs.
Ehmann, J. et al., "Real-Time Video Denoising on Mobile Phones," IEEE, ICIP 2018, 5 pgs.
Xu, X. et al., "Learning Deformable Kernels for Image and Video Denoising", Arxiv.org, Cornell University Library, Apr. 15, 2019, 10 pgs.
International Search Report and Written Opinion for Application No. PCT/EP2020/075964 dated Dec. 4, 2020, 15 pgs.
English Translation of International Search Report for Application No. PCT/EP2020/075964 dated Dec. 4, 2020, 1 pg.
EMVA Standard 1288, "Standard for Characterization of Image Sensors and Cameras", 45 pgs. 2020.

\* cited by examiner

METHOD FOR IMAGE PROCESSING BY MEANS OF A NEURAL NETWORK AND METHOD FOR TRAINING A NEURAL NETWORK

BACKGROUND

Technical Field

The present disclosure relates to a computer-implemented method for processing an image in a neural network.

Description of the Related Art

Neural networks, more precisely a convolutional neural network (CNN), are known, for example, from "Object Recognition with Gradient-Based Learning" by Yann LeCun et al. In particular, finding an appropriate set of features is discussed therein. CNNs prove to be particularly well suited for this task.

Digital cameras are used in various industrial applications. The scene to be recorded is usually illuminated using an illumination unit and imaged on an image sensor of the camera with the aid of an objective. Any processing steps can then be applied to the raw image formed, wherein it can subsequently be transmitted via a corresponding interface.

Digital cameras are used, inter alia, in traffic engineering, for example for detecting license plates, for checking product quality in production, and in monitoring technology. Samples, e.g., cell samples, are frequently evaluated in medical technology and also in the field of biology. The investigation of the sample is usually carried out with the aid of a microscope on which a digital camera is mounted. The camera records the sample and subsequently provides the user with a digital image of the sample. This image can then be used for further investigations, such as counting or classifying cells.

There are also many further applications for digital cameras and images, e.g., in the areas of astronomy, medicine, physics, biology, chemistry and art history, to name just a few.

In order to be able to accomplish the respective tasks, sufficient image quality is required. This means that the image content relevant to the task must be able to be recognized clearly enough in the image and is not unrecognizable due to image noise or other effects.

In addition, it is important, especially in the field of medical technology, that no image contents are distorted by the correction method or individual operations. In microscopy, exposure times of a few milliseconds up to several minutes are common. The evaluation time of a processing method should accordingly be within a similar time frame.

The removal of image noise, so-called denoising, is an important method for improving the image quality or for maintaining the image contents when processing image data.

The denoising can be calculated directly in the camera or in external hardware, for example in a computer, e.g., the customer's computer with a processor (CPU) or with a graphics processor (GPU). It is therefore desirable to make economical use of the resources as well as of the computing time in order to minimize the burden on the customer's computer and to save hardware resources. Furthermore, it is possible to carry out the calculation in the camera in a field-programmable gate array (FPGA) or in specific hardware, such as a frame grabber or microcontroller (MCU).

In this case, the demand for resources should also be kept to a minimum since computing power, energy, and chip area are always associated with costs.

Medical or biological samples are frequently very sensitive and can be damaged or destroyed by an excessive amount of light. Therefore, imaging recordings of such samples are frequently produced using small amounts of light, e.g., at low light intensity, as is often the case, for example, in microscopy. Under the mostly correct assumption that a camera that at least largely meets the EMVA1288 standard is involved in the recording, the result is that the recording subsequently has a low signal-to-noise ratio. This can significantly impair the recognizability and usability of the image. It is therefore desirable to improve the signal-to-noise ratio by reducing noise in the image.

If a sample is exposed to a small amount of light during a recording, a low exposure of the image sensor generally results. Significant forms of image noise at low exposures are primarily photon noise, also photon-shot noise, and dark noise, which is dominated by the electrical readout noise, also "read noise."

In the case of a low level of light intensity, exposure can in principle be increased by increasing the exposure time. As a result, the photon noise can usually be reduced and the recognizability and usability of the image can thus be improved. However, an increase in the exposure time according to EMVA1288 also leads to an increase in the dark noise and to an increase in the number of so-called hot pixels in the image.

So-called dark noise occurs without light impinging on the sensor of a camera. The reason for this noise is, on the one hand, the dark current of the individual light-sensitive elements, i.e., pixels, and, on the other hand, also the noise of the read-out amplifier. Dark noise occurs, for example, in fluorescence microscopy.

Hot pixels are pixels which do not react proportionally to the incident light, as a result of which, particularly in the case of long exposure times, they reproduce image values which are clearly too bright punctiformly (cf. EMVA 1288). The number of hot pixels rises primarily in the case of long exposure times and high ISO values or gain values. As the temperature increases, the number of hot pixels increases, and one method for avoiding hot pixels and image noise is therefore to keep the temperature of the camera low. Many digital cameras, which are intended for long exposure times, have cooling of the image sensor. Hot pixels are mainly caused by manufacturing inaccuracies and lead to further degradation of the image quality and in turn impair the recognizability and usability of the image.

A large number of "denoising" algorithms already exists, wherein a first approach however requires a series of image recordings, such as in J. Boulanger et al., "Patch-based non-local functional for denoising fluorescence microscopy image sequences," 2010.

Another approach initially generates synthetic training data by adding defined noise, such as Gaussian noise, to a noise-free data set, e.g., J. Xie et al., "Image Denoising and Inpainting with Deep Neural Networks," 2012. However, according to the definition of the EMVA 1288 standard, this does not represent a realistic noise model for digital cameras since Gaussian noise is not realistic.

Furthermore, numerous deep learning approaches exist, which preferably used CNNs with different network architectures, such as autoencoders, e.g., V. Jain et al., "Natural image denoising with convolutional networks," 2008, and H. C. Burger, "Image denoising: Can plain neural networks compete with BM3D?" in IEEE Conference on Computer Vision and Pattern Recognition, 2012.

In principle, however, the known disadvantages of deep learning approaches are the amount of data required and the resources needed as well as time-consuming training. A further common disadvantage is the lack of generalizability of the networks. This means that the network generally works well for the trained samples but not for other types of samples.

In addition to deep learning approaches, further denoising methods exist, which are based on so-called surface learning or classical approaches, such as P. Milanfar, "Fast, Trainable, Multiscale Denosing," 2018, S. Srisuk, "K-means based image denoising using bilateral filtering and total variation," 2014, or J. Ehmann, "Real-time video denoising on mobile phones," 2018.

The disadvantage of these methods is that various approaches, elements, or filters frequently have to be trained or developed separately at great expense and subsequently have to be combined.

BRIEF SUMMARY

Described herein is a correction method which both reduces the noise in digital images and at the same time does not distort the content of the image.

A method according to the disclosure for processing an image comprises the steps of dividing the image into at least two image regions, grouping at least one of the image regions into at least one group, wherein each of the image regions is assigned to exactly one group or to no group, and applying at least one kernel in a layer of a neural network to the image regions of at least one group, wherein at most one kernel is applied to the image regions of each group.

Furthermore proposed are a method for training a neural network as well as a device for image processing by means of a neural network and for training a neural network, and a computer-readable medium.

The kernels proposed here can in particular be convolution kernels, wherein the layer in which the kernels are applied to the image thereby becomes a convolutional layer in the neural network. In particular, the fact that the kernel is a convolution kernel means that the kernel is flipped, i.e., the kernel matrix is mirrored vertically. Without the vertical mirroring of the matrix, the operation is usually referred to as cross-correlation. However, since a cross-correlation within a neural network is always assumed here, the operation is frequently referred to as convolution even without vertical mirroring of the matrix. The layer can therefore be referred to in any case as a convolutional layer.

BRIEF DESCRIPTION OF THE SEVERAL VIEWS OF THE DRAWINGS

Advantages, features, and characteristics of the disclosure are explained by the following description of preferred embodiments of the accompanying drawings, in which.

DETAILED DESCRIPTION

The same or similar reference signs are used in the following for the same or similar components or steps.

Figure 1:
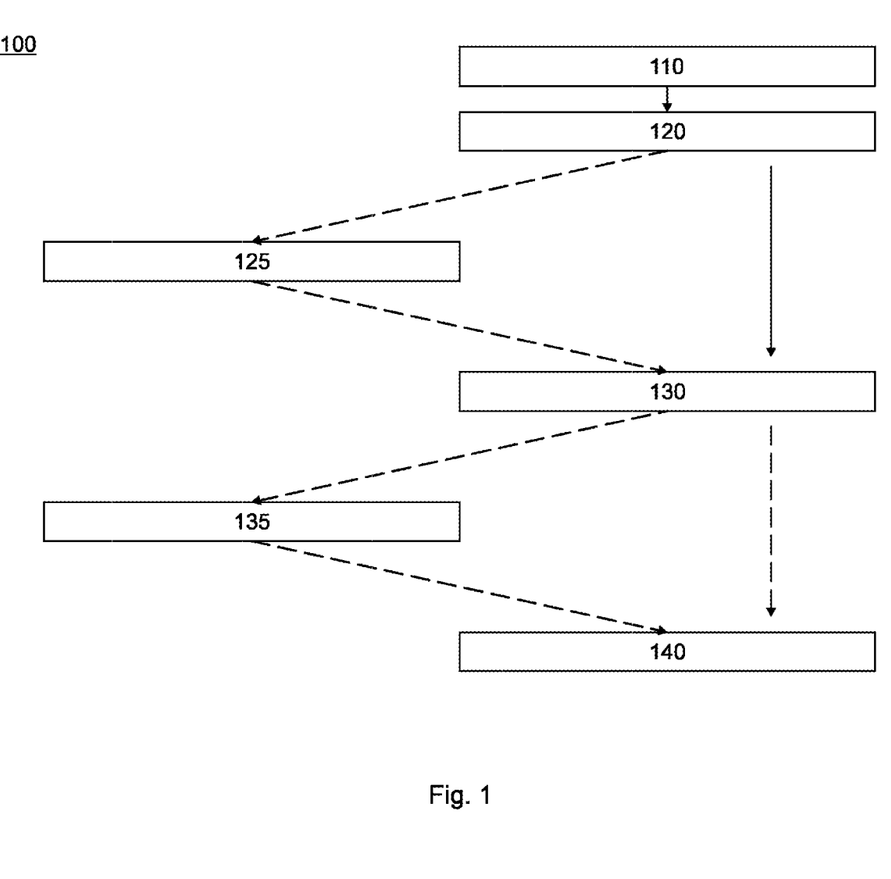
FIG. 1 shows a method according to an exemplary embodiment.

FIG. 1 shows a method 100 for processing an image according to an exemplary embodiment. In this case, an image is first divided into at least two image regions in step 110. The image regions may be the same size, e.g., 8×8 pixels, 16×16 pixels, 32×32 pixels. Alternatively, the image regions may also be different sizes.

The image can, for example, be divided into the image regions by applying a decomposition algorithm or a segmentation algorithm. In this case, the algorithms used can operate in a pixel-oriented, edge-oriented, region-oriented, model-based, texture-based manner.

Such algorithms are, for example, watershed transformation, threshold value method, random walk, quadtree, octtree, Felzenszwalb-Huttenlocher algorithm, Sobel operator, Laplace operator, live wire method, parallel or sequential edge extraction, optimal edge search, active shape models and snakes.

Further methods for dividing the image into image regions are conceivable, however, and the methods explained above serve merely as examples. In a further embodiment, image regions can overlap, i.e., there are regions that belong to more than one image region. This is described in more detail below.

Figure 2:
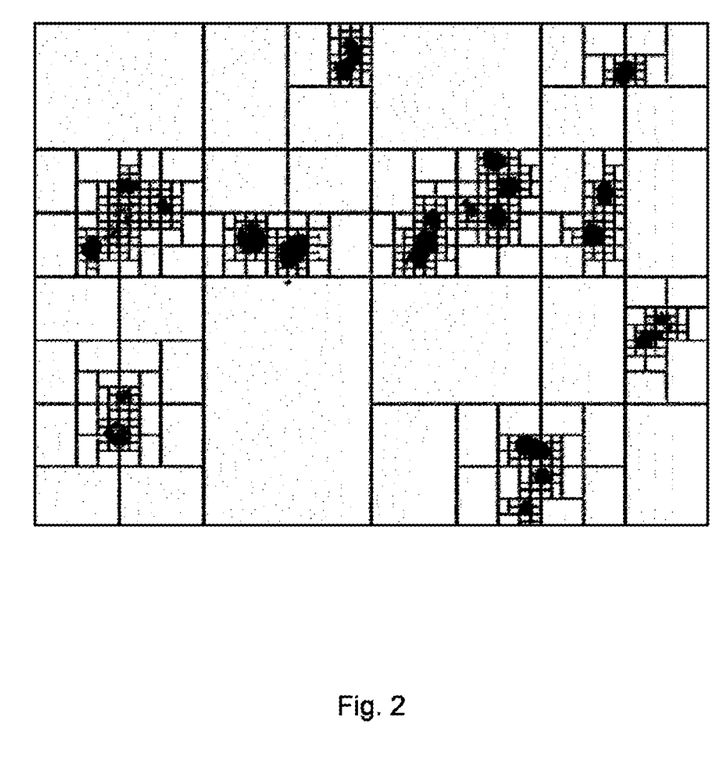
FIG. 2 shows a schematic exemplary image which is divided into image regions of different sizes.

FIG. 2 shows, by way of example, the division of an image into image regions which results from the application of a quadtree (H. Samet, "The Quadtree and Related Hierarchical Data Structures," 1984).

Subsequently, the image regions are grouped in step 120. In doing so, a group is assigned to at least one the image region. It is also possible for image regions that are not assigned to a group to be left over. This grouping is also known as classifying, classification, or clustering. No image region can be assigned to more than one group so that each image region is assigned either to exactly one group or to no group.

The image regions are grouped here on the basis of one or more of their properties, for example, so that image regions in which these properties are identical or similar are assigned to the same group. The measure of similarity can be varied in order to obtain more or fewer groups. This standard classifying technique is known to the person skilled in the art and is therefore not explained further here.

One or more property criteria of the image regions can be used for grouping the image regions. Examples of such property criteria are the intensity of the image regions, the orientation of the intensity gradient within the image regions, the colors or color values of the image regions, the structures within the image regions, edge orientation and, in the case of differently sized image regions, the size of the image regions can also be used for grouping. Further properties are also conceivable here.

The methods used for classification can be numerical or non-numerical, statistical or distribution-free, monitored or non-monitored, permanently dimensioned or learning, and parametric or non-parametric methods.

Exemplary so-called clustering or classification methods are, for example, k-means, support vector machines (SVMs) or Gaussian mixture models, the latter also multivariate. Further classification methods are known to the person skilled in the art, however, and any suitable algorithm that clusters the image regions can be used.

In the following step 130, at least one kernel in the layer of a neural network is applied to the image regions of at least one group, wherein at most one kernel is applied to the image regions of each of the groups.

Figure 3A:
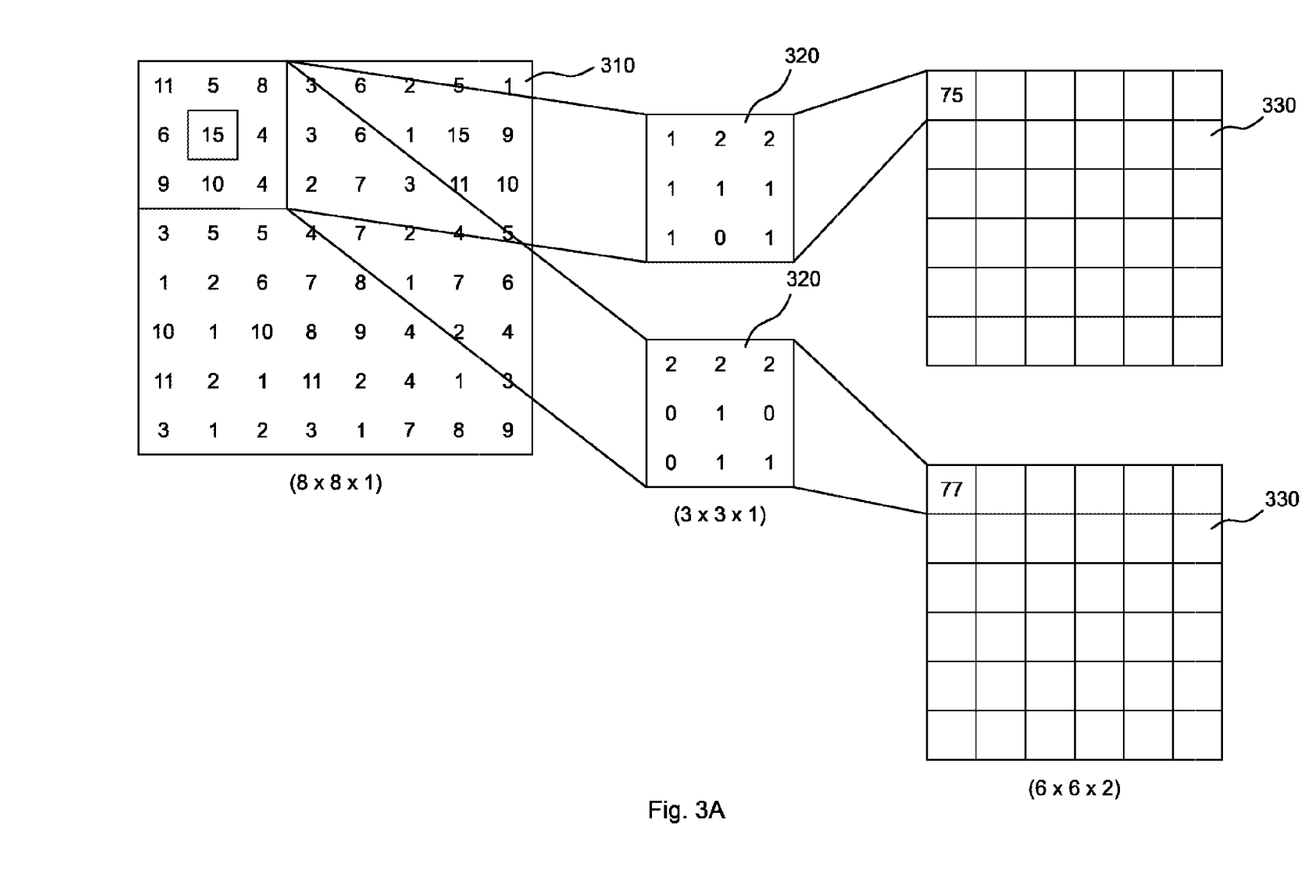
FIG. 3A shows an application of kernels to an image according to the prior art.

FIG. 3A shows the application of kernels to images to be processed according to the prior art. In this case, each kernel is applied to the entire image in regions.

By way of explanation, an image 310, which is 8×8 pixels in size, is assumed as an example. The following values for the pixels are assumed by way of example:

| 11 | 5  | 8  | 3  | 6 | 2 | 5  | 1  |
| 6  | 15 | 4  | 3  | 6 | 1 | 15 | 9  |
| 9  | 10 | 4  | 2  | 7 | 3 | 11 | 10 |
| 3  | 5  | 5  | 4  | 7 | 2 | 4  | 5  |
| 1  | 2  | 6  | 7  | 8 | 1 | 7  | 6  |
| 10 | 1  | 10 | 8  | 9 | 4 | 2  | 4  |
| 11 | 2  | 1  | 11 | 2 | 4 | 1  | 3  |
| 3  | 1  | 2  | 3  | 1 | 7 | 8  | 9  |

The kernels are 3×3 in size. After each calculation step, the kernel is moved to the right by one column. When the end of a row is reached, the kernel is applied to the next row. The size of the displacement corresponds in each case to the stride parameter and can also be different from 1. With a stride parameter of 1, in the case of two kernels 320 that are 3×3 in size, two result matrices 330 that are 6×6 pixels in size are produced.

The individual values of the image 310 here represent the values of the image dots, i.e., pixels, of the image. Depending on the bit depth of the image, the values comprise different value ranges. If the image 310 is in 8-bit grayscale, for example, the pixel values range from 0 to 255.

Each of the fields of the result matrices 330, each of which corresponds to one pixel of the image, is calculated, for example, as the sum of the products of the values of the image 310 with the respective corresponding value of the kernel 320 in a so-called cross-correlation.

In the example shown in FIG. 3A, each kernel starts at the beginning above the region in the top left corner of the image 310. This results in the following values of Table 1 for the result matrices:

TABLE 1

| Image value | Kernel value 1 | Kernel value 2 | Image value Kernel value 1 | Image value Kernel value 2 |
|---|---|---|---|---|
| 11 | 1 | 2 | 11 | 22 |
| 5  | 2 | 2 | 10 | 10 |
| 8  | 2 | 2 | 16 | 16 |
| 6  | 1 | 0 | 6  | 0  |
| 15 | 1 | 1 | 15 | 15 |
| 4  | 1 | 0 | 4  | 0  |
| 9  | 1 | 0 | 9  | 0  |
| 10 | 0 | 1 | 0  | 10 |
| 4  | 1 | 1 | 4  | 4  |

The sum of the products is then entered into the result matrices 330, which sum is 75 or 77 in the above case.

The kernels are then shifted to the right by one column according to the stride parameter having the value 1, which results in the following Table 2:

TABLE 2

| Image value | Kernel value 1 | Kernel value 2 | Image value Kernel value 1 | Image value Kernel value 2 |
|---|---|---|---|---|
| 5  | 1 | 2 | 5  | 10 |
| 8  | 2 | 2 | 16 | 16 |
| 3  | 2 | 2 | 6  | 6  |
| 15 | 1 | 0 | 15 | 0  |
| 4  | 1 | 1 | 4  | 4  |
| 3  | 1 | 0 | 3  | 0  |
| 10 | 1 | 0 | 10 | 0  |
| 4  | 0 | 1 | 0  | 4  |
| 2  | 1 | 1 | 2  | 2  |

Consequently, the values 61 and 42 would be entered into the next fields of the result matrices 330.

The example shown in FIG. 3A shows an image without so-called zero padding. Zero padding means that the edges of the image are surrounded by zero values. When a kernel with k columns and rows is applied, the dimensions of the image are reduced by k−1.

The dimension of the result matrix are reduced in the conventional method without zero padding and a stride parameter of 1 as follows:

Result matrix$_x$=Input image$_x$−(Kernel$_x$−1), or

Result matrix$_y$=Input image$_y$−(Kernel$_y$−1).

Result matrix$_{x/y}$, input image$_{x/y}$, and kernel$_{x/y}$ respectively denote the x or y dimension of the result matrix, input image, and kernel.

Figure 3B:
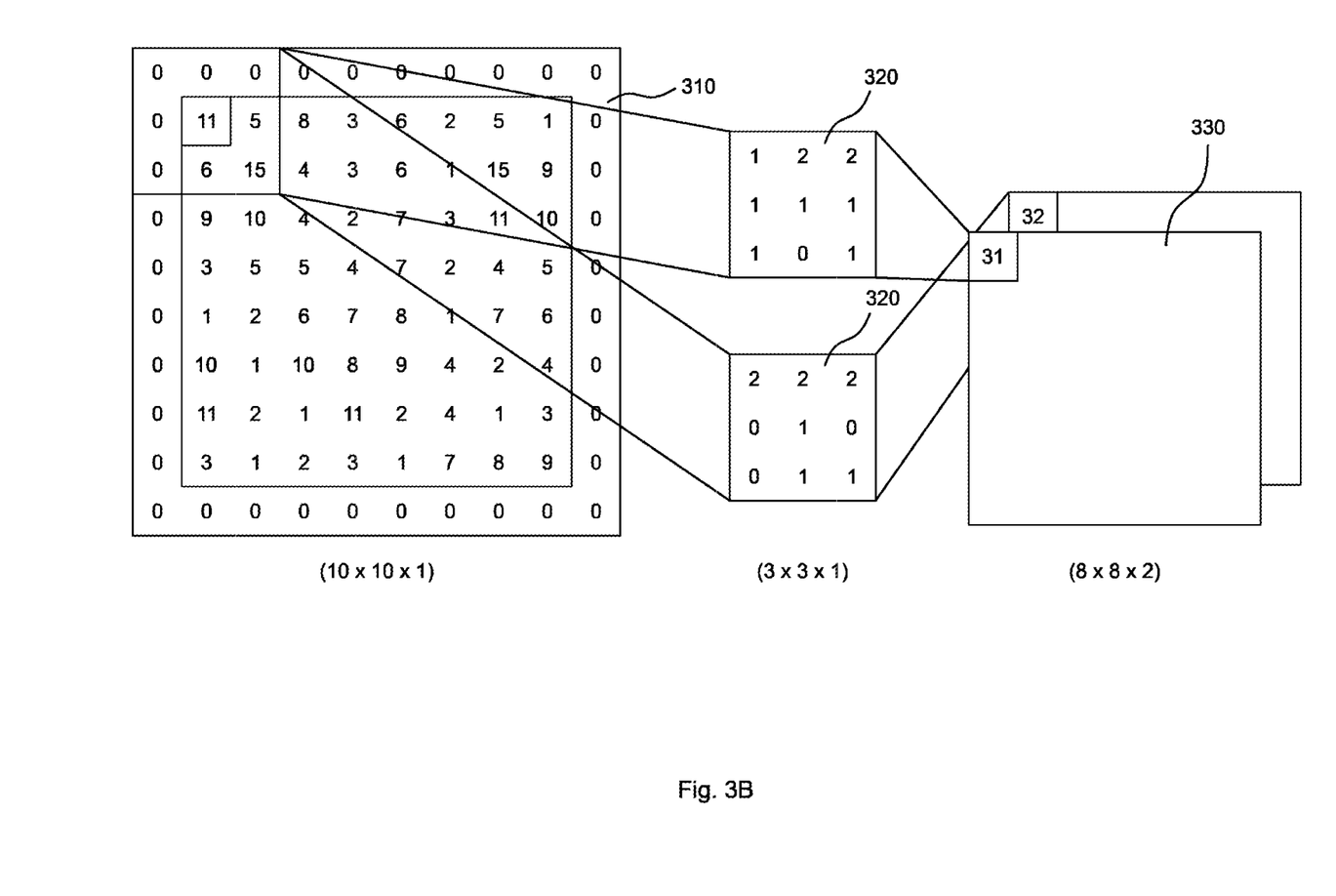
FIG. 3B shows an application of kernels to an image according to the prior art with zero padding.

If the number of columns and rows is increased by k−1 in each case before the kernels are applied, the result matrices in turn have the same size as the input image. However, even with zero padding, there is no change to the method shown so that a person skilled in the art can also easily apply said method to an image with zero padding. This is shown in FIG. 3B. Due to the additional values at the edge of the image, the image increases to 10×10 pixels, and the result matrices increase to 8×8 values as a result, which in turn corresponds to the size of the input image.

Figure 4A:
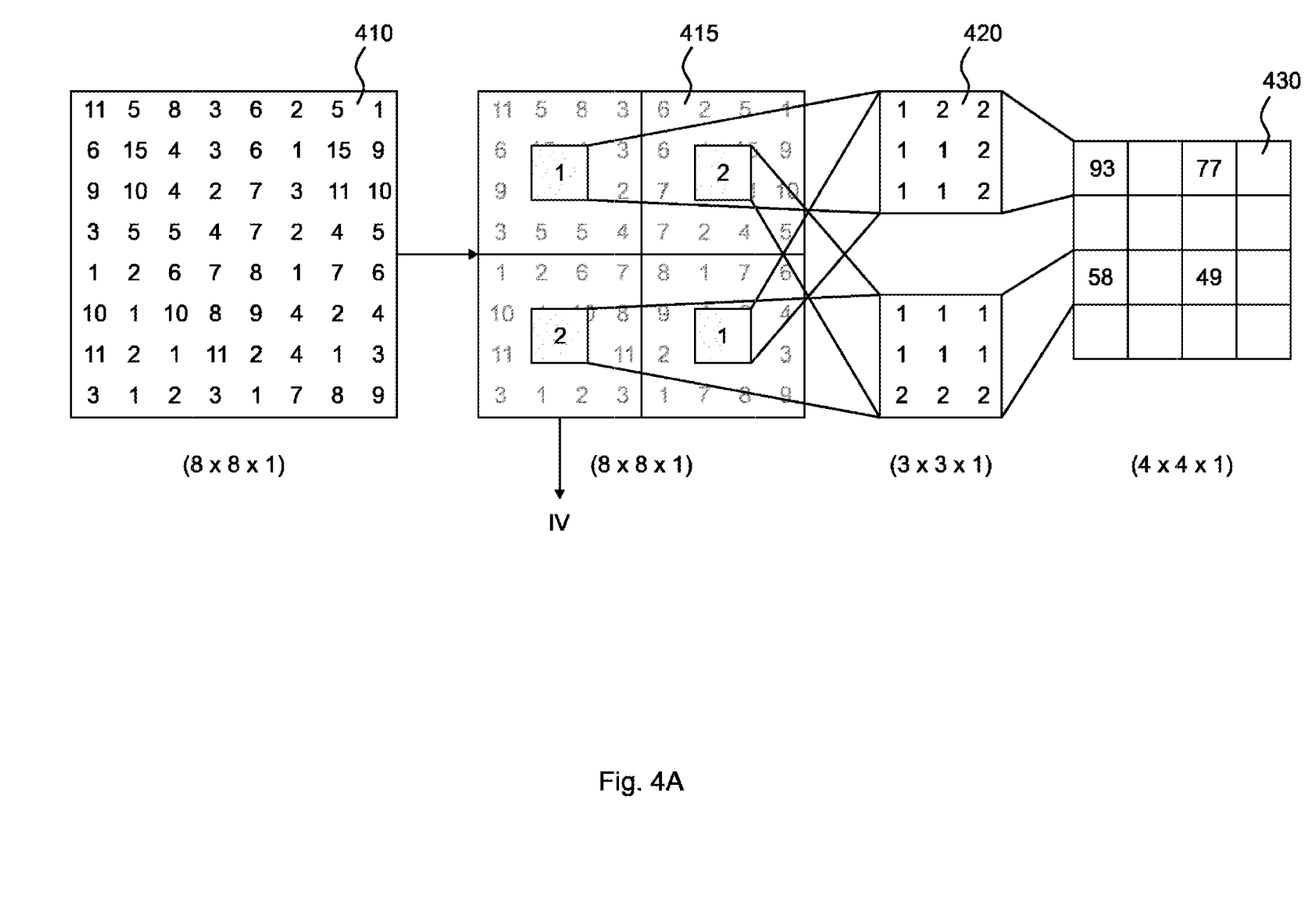
FIGS. 4A and 4B show an application of kernels to an image according to an exemplary embodiment.
Figure 4B:
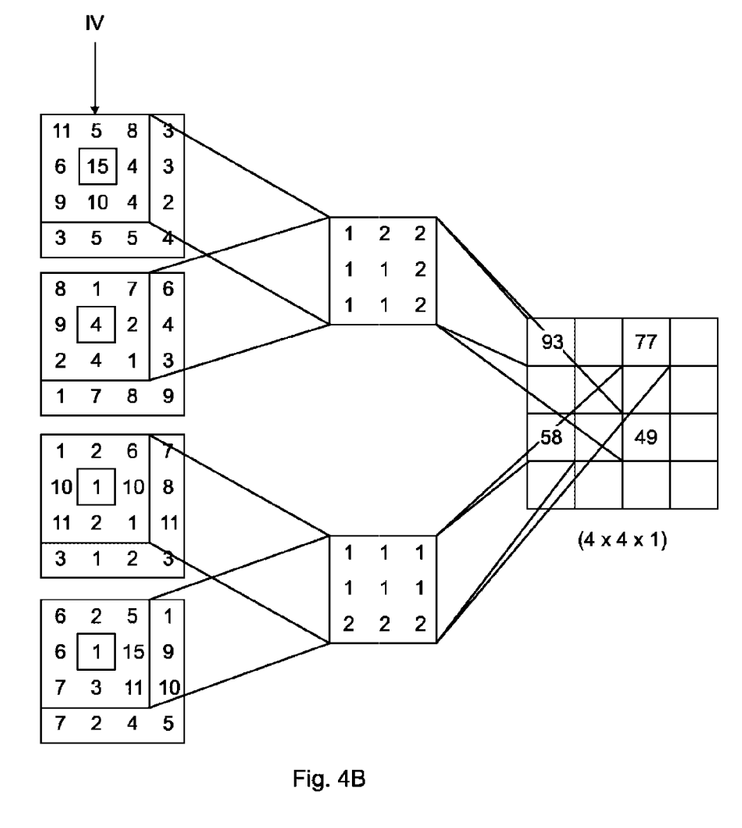

FIGS. 4A and 4B show the cross-correlation for the inventive method, wherein only one kernel is applied in each case for the divided image regions that are each assigned to a group. From FIG. 4A, at the transition point of the drawings marked with IV, a connection is made from FIG. 4A to FIG. 4B.

For example, an image 410 having the same values as before is assumed as input image:

| 11 | 5  | 8  | 3  | 6 | 2 | 5  | 1  |
| 6  | 15 | 4  | 3  | 6 | 1 | 15 | 9  |
| 9  | 10 | 4  | 2  | 7 | 3 | 11 | 10 |
| 3  | 5  | 5  | 4  | 7 | 2 | 4  | 5  |
| 1  | 2  | 6  | 7  | 8 | 1 | 7  | 6  |
| 10 | 1  | 10 | 8  | 9 | 4 | 2  | 4  |
| 11 | 2  | 1  | 11 | 2 | 4 | 1  | 3  |
| 3  | 1  | 2  | 3  | 1 | 7 | 8  | 9  |

In FIGS. 4A and 4B, the image regions are the same size, i.e., the original image 410 having 8×8 pixels is divided here as an example into four regions, each comprising 4×4 pixels. The dividing of the image 410 into image regions can be seen in image 415. For the example, these four regions look as follows:

| 11 | 5  | 8 | 3 |
| -- | -- | - | - |
| 6  | 15 | 4 | 3 |
| 9  | 10 | 4 | 2 |
| 3  | 5  | 5 | 4 |

| 6 | 2 | 5  | 1  |
| - | - | -- | -- |
| 6 | 1 | 15 | 9  |
| 7 | 3 | 11 | 10 |
| 7 | 2 | 4  | 5  |

| 1  | 2 | 6  | 7  |
| -- | - | -- | -- |
| 10 | 1 | 10 | 8  |
| 11 | 2 | 1  | 11 |
| 3  | 1 | 2  | 3  |

| 8 | 1 | 7 | 6 |
| - | - | - | - |
| 9 | 4 | 2 | 4 |
| 2 | 4 | 1 | 3 |
| 1 | 7 | 8 | 9 |

By way of example, the four regions in FIGS. 4A and 4B are divided into two groups, wherein the top left and the bottom right region are assigned to group 1 and the remaining regions are assigned to group 2.

The individual values of the image 410 in turn represent the values of the image dots, i.e., pixels, of the image. Depending on the bit depth of the image, the values comprise different value ranges. If the image 410 is, for example, in 8-bit grayscale, the pixel values range from 0 to 255. In addition, the image 410 can represent only one channel of an overall image, depending on the color model of the overall image. Thus, image 410 can, for example, only represent one of the red, green or blue color channels if the overall image is in the RGB color model. In a similar way, and easily recognized by the person skilled in the art, the present method is however also suitable for every other color space, e.g., YCMK, YCbCr, YUV, HSV. Depending on the color space, the respective value of an image dot represents the intensity of the color channel or the brightness or saturation.

Since, in the case of a stride parameter of 1 to be used within the respective image regions, a 3×3 kernel 420 can be placed in a 4×4 image region exactly 4 times, four values for each image region result in the result matrix. The stride parameter can also specify a different value.

The following values are used by way of example for the kernels:

| Kernel 1: | | |
| - | - | - |
| 1 | 2 | 2 |
| 1 | 1 | 2 |
| 1 | 1 | 2 |

| Kernel 2: | | |
| - | - | - |
| 1 | 1 | 1 |
| 1 | 1 | 1 |
| 2 | 2 | 2 |

In this case, the individual image regions are individually correlated with the respective kernel, and the entire result matrix is subsequently reassembled from the individual results.

For the example shown in FIGS. 4A and 4B, corresponding values result for the 4 image regions and represent partial results of the entire result matrix 430. Since, in comparison to the conventional method described in FIGS. 3A and 3B, the regions do not overlap, a result matrix 430 of 4×4 pixels results. In the proposed method, the reduction in dimensions in relation to the input image can be calculated relatively easily for image regions of the same size and a stride parameter of 1 as follows:

$$\text{Result matrix}_x = \text{Input image}_x - (\text{Kernel}_x - 1) \times \text{Regions}_x,$$

or $$\text{Result matrix}_y = \text{Input image}_y - (\text{Kernel}_y - 1) \times \text{Regions}_y.$$

Result matrix$_{x/y}$, input image$_{x/y}$, and kernel$_{x/y}$ respectively denote the x or y dimension of the result matrix, input image, and kernel. Regions$_{x/y}$ denotes the number of image regions in the x or y direction.

The following applies: Total number of image regions=Regions$_x$×Regions$_y$.

With differently-sized image regions, the calculation is somewhat more complex, but the size of the input image can be achieved with zero padding of the regions or by targeted overlap, i.e., padding of neighboring regions.

The calculation of the partial results from an image region and the associated kernel in each case can be carried out successively or simultaneously, i.e., in parallel. It is irrelevant whether the image regions are of equal size or of different sizes.

In order to obtain a result matrix in the same size as the input image, the individual image regions can be increased accordingly in the proposed method using the zero padding method or by padding with the neighboring pixels.

When image regions overlap, the average value for those pixels for which there is more than one value is formed from all the available values for the respective pixel when the entire result matrix is compiled.

The advantage becomes obvious in the case of correspondingly larger image dimensions. For example, in the case of an input image that is 128×128 pixels in size, 16 result matrices that are 128×128 in size are produced in the conventional method with 16 filters, assuming corresponding padding. The overall data volume is thus 128×128×16.

By using the proposed method, however, irrespective of the number of kernels, only one matrix that is 128×128 in size is always produced, again assuming corresponding padding, which means a data reduction by a factor of 16. In this way, with the same number of kernels, hardware resources can be saved, and it is even specifically the case that the data volume of the result matrix is identical to the data volume of the input image.

Moreover, since each kernel is applied to each pixel in the conventional method, the proposed method results in a reduction of the computing effort.

Furthermore, the proposed method can also have an advantageous effect on the image quality, wherein image regions of the same group are processed in the same way, but image regions of different groups are processed in another way. The structures of the input image can thus be better maintained.

This not only has an advantage for denoising but also for other tasks, such as deblurring or inpainting. Furthermore, classification tasks can be accelerated by, for example, not processing homogeneous image regions since often only the edges are frequently of interest.

The application of the proposed method for denoising for fluorescence microscopy is explained below as a further application. In this case, primarily the hot pixels and the dark noise are to be reduced since they, according to the EMVA 1288 standard, depend directly on the exposure time.

It is assumed here that the images to be corrected are recorded by a digital camera mounted on a fluorescence microscope.

In this case, the clustering algorithm is trained on the basis of training examples so that it can classify the image regions created according to the selected properties. The image regions created can thus be subsequently processed by the network in another way according to their label, i.e., to which group they belong.

The input image here is, for example, a grayscale image or color image for which the noise is to be reduced. The individual image regions were grouped according to the clustering algorithm. Optionally, there is a list of image coordinates of the individual image regions. The input image is now processed by the proposed application of kernels 130 to the image regions. This results in small structures and edges.

Furthermore, before, during, or after this application of kernels 130 to the image regions, the input image is processed, for example, by a pooling layer, preferably by a median or min pooling layer, as a result of which the number of hot pixels is reduced. The proposed application of kernels can likewise be applied to the result image of said processing. In order to preserve the original image dimensions, either the input image or the result image can be processed by a corresponding upsampling layer. A detailed description of the layers can be found, for example, in the Keras library documentation.

The result images both from the actual application of kernels and from the pooling layer are subsequently combined in a merge layer. This can be carried out, for example, by means of an add layer or an average layer. Finally, further ones of the proposed application of kernels can be applied.

The network can be trained by a corresponding data set. This data set can, for example, consist of image pairs which each consist of a noisy image and an associated noise-free image.

The network architecture can be trained in a so-called end-to-end method.

In the inference of the network, it is conceivable that image regions are assigned to a particular cluster group that was not available in the training data. As a result, the filters or kernels of the proposed layer assigned to the corresponding cluster group were not trained.

Figure 5:
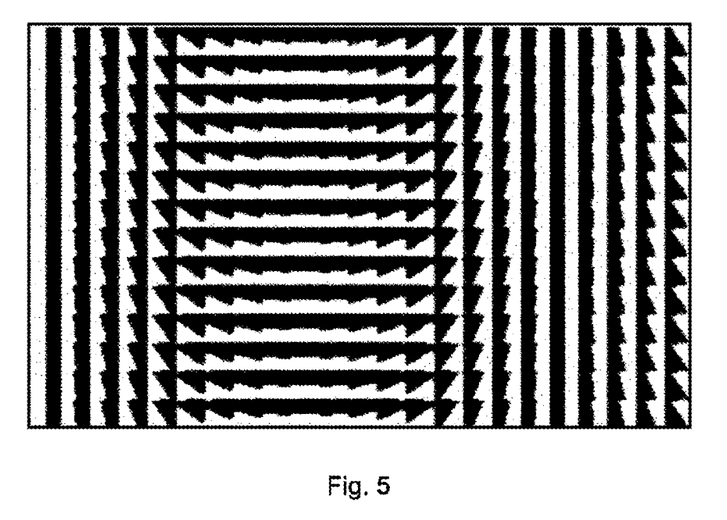
FIG. 5 shows an image for training a neural network according to an exemplary embodiment.
Figure 6:
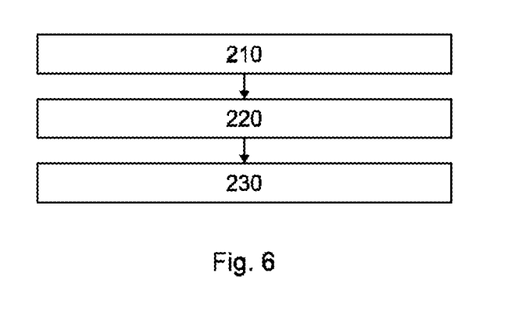
FIG. 6 shows a method for training a neural network according to an exemplary embodiment.

FIG. 6 shows a method 200 for training a neural network. The network is trained here on at least one image, a so-called test pattern. The test pattern contains the desired feature attributes, e.g., different edge orientations, colors, or intensities. An exemplary test pattern is shown in FIG. 5.

In this case, in step 210, an image divided into at least two image regions is read first. The division can be established beforehand or can be carried out in the layer of the neural network in which the kernel is also subsequently trained, in another layer of the neural network or in another neural network.

This is followed in a step 220 by a grouping of at least one of the image regions into at least one group, wherein each of the image regions is assigned to exactly one group or to no group.

In this case, the grouping can also be established beforehand or can be carried out in the layer of the neural network in which the kernel is also subsequently trained, in another layer of the neural network, or in another neural network.

Subsequently, in a step 230, at least one kernel 420 is applied in a layer of the neural network or in one of the neural networks to the image regions of at least one group, wherein at most one kernel is applied to the image regions of each group.

Training is explained in more detail below with reference to an example, denoising.

By using a test pattern, the clustering algorithm can learn the desired cluster groups accordingly. In addition, it is ensured that the kernels are trained for all cluster groups. In order for the network to be able to learn a denoising method, for example, the test patterns are superimposed with corresponding noise. The training with test patterns additionally avoids an overadapting of the weights of the network to, for example, certain types of samples of the training data.

The network thus learns denoising, for example, for different edge orientations but not for certain sample types. If the network is trained, for example, on edge orientations, significantly fewer training data are required for this purpose than if the network is to be trained directly on the microscopic samples.

For the training, using the example of denoising, a noisy input image that was already divided into image regions that are also already clustered is fed to the neural network. In order to determine the success during training, the corresponding noise-free image is provided. The neural network is then trained by the known method of back propagation. However, since, according to the inventive method, a kernel is in each case only applied, i.e., filtered, to specific image regions in the image according to the clustered groups, the method has the advantage that the training can be carried out with only one test pattern. Several image pairs consisting of noisy and noise-free images can also be used but, in contrast to conventional training methods, one image pair is sufficient.

The input for the training is the noisy test pattern having image regions that have already been grouped. The so-called ground truth, i.e., the ideal result image, is the noise-free test pattern. Each filter, i.e., kernel, is adapted by the back propagation method such that it best denoises on average all image regions to which it is applied.

Because the image regions of one cluster group respectively all have the same properties, e.g., the same edge orientations or the like as explained above, this filter learns to denoise the correspondingly labeled image regions in this property. Of course, this also applies to the other filters.

It is also possible to extend an already existing neural network by the convolutional layer according to the present disclosure or to replace an already existing layer in a neural network by the convolutional layer according to the disclosure.

In this case, it is also possible to train only the layer according to the present disclosure. In general, however, the network is usually trained as a whole, and not just a layer in a network.

If the dividing of the image and the grouping of the image regions takes place outside the network, corresponding cluster methods naturally need to be trained beforehand, if they are used.

Due to different settings of the camera gain, for example, and of the exposure time, images with varying degrees of noise are produced. It is therefore conceivable that, after processing using the denoising method, images with a high degree of noise, for example, do not achieve the same image quality as images with a lower degree of noise. Therefore, if information about the set camera gain and the exposure time are available, a different processing of the input image can be carried out accordingly.

Furthermore, any input dimensions are possible after the network has been trained. In the case of a method according to the prior art, however, the input dimensions for the classical convolutional layer must be defined at the beginning of the training.

Further processing steps 125 can optionally be performed before the just discussed application of at least one kernel 130 to the groups of image regions. These further processing steps 125 can comprise conventional convolution, i.e., applying kernels according to the prior art, or different processing, as already explained above, such as pooling, upsampling, etc.

However, the steps 125 can also comprise applying at least one kernel 130 according to the exemplary embodiment described above. In this case, the dividing of the image into the image regions can be identical to step 130 or different.

After the application discussed above of at least one kernel 130 to the groups of image regions, further processing steps 135 can optionally be performed. These further processing steps 135 can comprise conventional convolution, which is known to the person skilled in the art, but steps 135 can also include applying at least one kernel 130 according to the exemplary embodiment described above. In this case, the dividing of the image into the image regions can be identical to step 130 or different.

The steps discussed above of dividing 110, grouping 120 and the possible further processing steps 125 and/or 135 can be carried out in this case in the layer of the neural network in which the at least one kernel is applied 130. However, it is also conceivable that some or all of these steps are carried out in another layer of the same neural network or in another neural network. In addition, some or all of these steps may also be performed outside of neural networks. Furthermore, the further steps 125, 135 may also be performed at least partially in parallel to the application of the at least one kernel 130, so that the further processing steps 125, 135 may be performed before, during, or after the application of the at least one kernel 130.

Similarly, the same applies to the training method 200 in which the steps of reading 210 and grouping 220 can be performed in the layer of the neural network in which at least one kernel 230 is applied, in another layer of the neural network, in another neural network or outside of neural networks.

Further examples of processing steps which can be carried out within the same layer are, for example, the application of an activation function, for example Relu, Softmax, or the addition of a bias value, or batch normalization. Outside of the layer, in another layer or another network, any other processing by means of layers can then follow, such as pooling, upsampling, or fully connected, i.e., dense layer.

If the steps of dividing and grouping in steps 125 and/or 135 are different from step 130, these differences may consist in that another algorithm is used for dividing and/or grouping and/or in that other parameters are used for the dividing and/or grouping.

However, steps 125 and/or 135 can also include other processing steps of the image, e.g., processing steps that include, for example, preparatory measures, such as cutting, color reduction, change in contrast or the like. In addition, it is also conceivable that further processing steps are carried out in parallel to the application of the kernel 130, while the processing is running. The results, which are achieved separately, can subsequently be combined or further processed separately.

Furthermore, the processed image can be output in a subsequent step 140. The output of the image does not differ from the output of an image known to the person skilled in the art.

Figure 7:
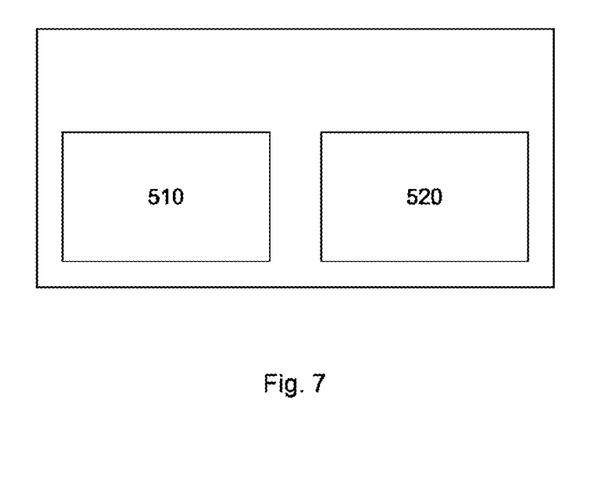
FIG. 7 shows a device for processing an image in a neural network according to an exemplary embodiment.

FIG. 7 shows a device 500 for processing an image in a neural network. This comprises at least one memory 510, wherein at least one image is stored in at least one of the memories. Furthermore, the device 500 comprises at least one processor 520, wherein at least one of the processors is configured to perform, as described above, a method for processing an image in a neural network or a method for training a layer of a neural network.

Additionally described is a computer-readable medium which comprises commands that, when executed by a processor, cause the latter to perform the steps of a method for processing an image in a neural network or of a method for training a layer of a neural network as described above.

Figure 8:
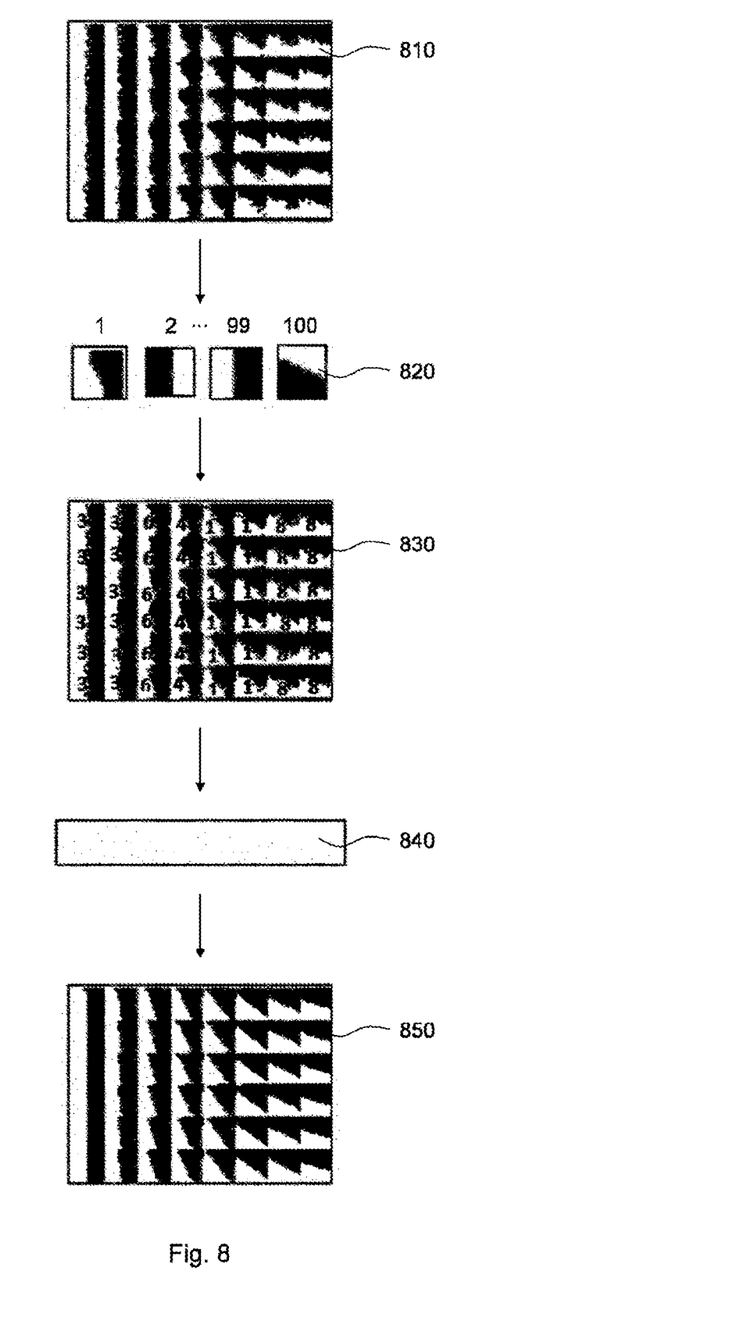
FIG. 8 shows a schematic, exemplary method of an application for denoising.

FIG. 8 shows by way of example and schematically the process of the entire denoising method. Here, the input image 810 is initially subdivided into image regions 820. Subsequently, the image regions are divided by a previously-trained clustering algorithm into the cluster groups 1 to 100. This results in the labeled input image 830, here with the groups 1 to 8. The noise-reduced result image 850 is then created by the inventive method in a neural network 840. In this example, the steps of dividing and grouping take place outside the convolutional layer of the neural network.

It is conceivable that these steps are performed beforehand in another layer of the same neural network, by another neural network, or outside of neural networks.

LIST OF REFERENCE SIGNS

100 Method for processing an image
110 Step: Dividing
120 Step: Grouping
125 Further steps
130 Step: Applying at least one kernel
135 Further steps
140 Step: Outputting
200 Method for training a neural network
210 Step: Reading an image
220 Step: Grouping
230 Step: Applying at least one kernel
310 Input image (prior art)
320 Kernel (prior art)
330 Result matrices (prior art)
410 Input image
415 Input image divided into grouped image regions
420 Kernels
430 Result matrices
500 Device
510 Memory
520 Processor
810 Input image
820 Image regions
830 Input image divided into grouped image regions
840 Neural network
850 Result image The various embodiments described above can be combined to provide further embodiments. All of the non-patent publications referred to in this specification are incorporated herein by reference, in their entirety. Aspects of the embodiments can be modified, if necessary to employ concepts of the various publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented method for processing an image using a neural network, comprising:
    dividing the image into a plurality of image regions;
    grouping at least two image regions of the plurality of image regions into at least two groups based on one or more properties of the plurality of image regions, wherein each of the plurality of image regions is assigned to exactly one group or to no group and image regions with the same or similar properties are assigned to the same group;
    computing partial results for the image regions of the at least two groups by:
        applying at least two kernels in a layer of the neural network to the image regions of the at least two groups, wherein at most one kernel is applied to the image regions of each group; and
    generating a result matrix of a layer of the neural network based on the partial results for the image regions of the at least two groups, wherein a data volume of the result matrix is less than a data volume that would be produced by applying each of the at least two kernels to each image region of the plurality of image regions.

2. The method according to claim 1, wherein the at least two kernels include a convolution kernel.

3. The method according to claim 1,
    wherein before, during, or after applying the at least two kernels, further processing steps of the image are performed; and
    wherein one or more of the further steps and of the steps of dividing and grouping are performed in the layer of the neural network, in another layer of the neural network, in another neural network, or outside of neural networks.

4. The method according to claim 1, further comprising outputting the processed image after convolution.

5. The method according to claim 1,
    wherein the dividing the image into the plurality of image regions divides the image into image regions of equal size.

6. The method according to claim 1,
    wherein the dividing the image into the plurality of image regions divides the image into differently sized image regions; and/or
    wherein the dividing the image into the plurality of image regions is carried out by decomposition.

7. The method according to claim 1,
    wherein the grouping groups the image regions with the same properties into one of the groups in each case.

8. The method according to claim 7, wherein the same properties of the image regions correspond to at least one of the following criteria:
    orientation of the intensity gradient;
    colors of the image regions;
    intensities of the image regions;
    structures within the image regions;
    edge orientation; and/or
    in the case of differently sized image regions, image regions of the same size.

9. The method according to claim 1,
    wherein the grouping groups the image regions by means of clustering or classification algorithms.

10. A non-transitory computer-readable medium comprising commands which, when executed by a processor, cause the processor to perform the steps of the method according to claim 1.

11. A computer-implemented method for training a neural network, comprising:
    reading an image that is divided into a plurality of image regions;
    grouping at least two image regions of the plurality of image regions into at least two groups based on one or more properties of the plurality of image regions, wherein each of the plurality of image regions is assigned to exactly one group or to no group and image regions with the same or similar properties are assigned to the same group;
    computing partial results for the image regions of the at least two groups by:
        applying at least two kernels in a layer of the neural network to the image regions of the at least two groups, wherein at most one kernel is applied to the image regions of each group; and
    generating a result matrix of a layer of the neural network based on the partial results for the image regions of the at least two groups, wherein a data volume of the result matrix is less than a data volume that would be produced by applying each of the at least two kernels to each image region of the plurality of image regions.

12. A device for processing an image in a neural network, comprising:
    at least one memory, wherein at least one image is stored in at the least one memory; and
    at least one processor, wherein the at least one processor is configured to:
        divide the image into a plurality of image regions;
        group at least two image regions of the plurality of image regions into at least two groups based on one or more properties of the plurality of image regions, wherein each of the plurality of image regions is assigned to exactly one group or to no group and image regions with the same or similar properties are assigned to the same group;
        compute partial results for the image regions of the at least two groups by being further configured to:
            apply at least two kernels in a layer of the neural network to the image regions of the at least two groups, wherein at most one kernel is applied to the image regions of each group; and
        generate a result matrix of a layer of the neural network based on the partial results for the image regions of the at least two groups, wherein a data volume of the result matrix is less than a data volume that would be produced by applying each of the at least two kernels to each image region of the plurality of image regions.

13. The device according to claim 12, wherein the at least two kernels include a convolution kernel.

14. The device according to claim 12,
    wherein before, during, or after applying the at least two kernels, the processor is further configured to perform further processing steps of the image; and
    wherein one or more of the further steps and of the steps of dividing and grouping are performed in the layer of the neural network, in another layer of the neural network, in another neural network, or outside of neural networks.

15. The device according to claim 12, wherein the processor is further configured to output the processed image after convolution.

16. The device according to claim 12,
    wherein the dividing the image into the plurality of image regions divides the image into image regions of equal size.

17. The device according to claim 12,
wherein the dividing the image into the plurality of image regions divides the image into differently sized image regions; and/or
wherein the dividing the image into the plurality of image regions is carried out by decomposition.

18. The device according to claim 12,
wherein the grouping groups the image regions with the same properties into one of the groups in each case.

19. The device according to claim 18, wherein the same properties of the image regions correspond to at least one of the following criteria:
orientation of the intensity gradient;
colors of the image regions;
intensities of the image regions;
structures within the image regions;
edge orientation; and/or
in the case of differently sized image regions, image regions of the same size.

20. The device according to claim 12,
wherein the grouping groups the image regions by means of clustering or classification algorithms.

* * * * *